United States Patent [19]

MacArthur et al.

[11] Patent Number: 5,311,025
[45] Date of Patent: May 10, 1994

[54] FAN-LESS LONG RANGE ALPHA DETECTOR

[75] Inventors: Duncan W. MacArthur; John A. Bounds, both of Los Alamos, N. Mex.

[73] Assignee: The Regents of the University of California, Oakland, Calif.

[21] Appl. No.: 933,143

[22] Filed: Aug. 21, 1992

[51] Int. Cl.$^5$ .................... G01Y 5/00; G01T 1/105
[52] U.S. Cl. .................... 250/374; 250/380; 250/253
[58] Field of Search .............. 250/374, 380, 384, 253

[56] References Cited

U.S. PATENT DOCUMENTS

| | | | |
|---|---|---|---|
| 2,499,830 | 3/1950 | Molloy | 250/374 |
| 4,186,303 | 1/1980 | Smith et al. | 250/253 |
| 4,262,203 | 4/1981 | Overhoff | 250/374 |
| 4,426,575 | 1/1984 | Malmqvist et al. | 250/253 |
| 4,704,573 | 11/1987 | Urban et al. | 250/253 |
| 4,786,804 | 11/1988 | Ilmasti | 250/253 |
| 4,814,608 | 3/1989 | Dempsey et al. | 250/253 |
| 4,859,854 | 8/1989 | Kershner et al. | 250/374 |
| 5,184,019 | 2/1993 | MacArthur et al. | 250/380 |
| 5,187,370 | 2/1993 | MacArthur et al. | 250/374 |
| 5,194,737 | 3/1993 | MacArthur et al. | 250/374 |

OTHER PUBLICATIONS

Khan et al, "Electrets for Passive Radon Daughter Dosimetry," Health Physics vol. 46 #1, Jan. 1984 pp. 141-149.

Kotrappa et al, "An Electrete Passive Environmental $^{222}$Rn Monitor Based on Ionization Measurement" Health Physics vol. 54 #1, Jan. 1988 pp. 47-56.

Kotrappa et al, "Passive Measurement of Radon and Thoron Using TLD or SSNTD on Electrets", Health Physics vol. 43 #3 Sep. 1982 pp. 399-404.

Kotrappa et al, "Measuement of Potential Alpha Energy Concentration of Radon and Thoron Daughters Using Electrete Dosimeter" Nuclear Tech. Pub., vol. 5 #1 1983 pp. 49-56.

Primary Examiner—Paul M. Dzierzynski
Assistant Examiner—Drew A. Dunn
Attorney, Agent, or Firm—Milton D. Wyrick

[57] ABSTRACT

A fan-less long range alpha detector which operates by using an electrical field between a signal plane and the surface or substance to be monitored for air ions created by collisions with alpha radiation. Without a fan, the detector can operate without the possibility of spreading dust and potential contamination into the atmosphere. A guard plane between the signal plane and the electrically conductive enclosure and maintained at the same voltage as the signal plane, reduces leakage currents. The detector can easily monitor soil, or other solid or liquid surfaces.

8 Claims, 1 Drawing Sheet

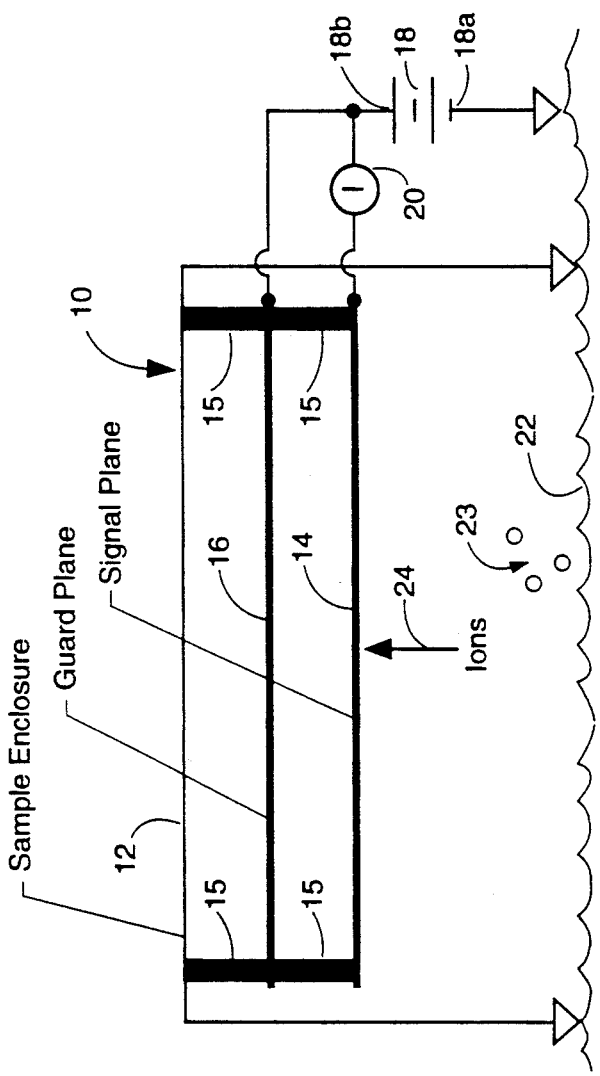

FAN-LESS LONG RANGE ALPHA DETECTOR

The invention is a result of a contract with the Department of Energy (Contract No. W-7405-ENG-36).

BACKGROUND OF THE INVENTION

The present invention generally relates to the monitoring for alpha particle contamination and, more specifically, to the monitoring of alpha contamination without the use of a fan to draw air containing ions into the detector.

In any area where radioactive materials are handled, it is imperative, both for the protection of personnel and to avoid contamination of the environment, to continuously monitor personnel, equipment and clothing to prevent the release of radioactive contamination. Alpha contaminants, such as plutonium, are particularly difficult to detect because of the limited penetration of alpha particles in air. Alpha particles from typical contaminants travel no more than one inch in air. It is because of this characteristic that prior alpha detectors have been useful only when used in close proximity to the point of possible emission. Prior to the development of the long range alpha detector technology, alpha contamination could not be detected if it originated in a space that was too small for insertion of a conventional monitor. Prior detectors have normally been employed in personnel screening when moved slowly in close proximity to a person's body. Workers in nuclear processing facilities must place their hands and feet on sensors when moving from room to room. All of this can slow operations, as it is not currently possible to adequately screen personnel within a reasonable period of time.

It is also extremely difficult to monitor equipment for alpha contamination, again due to the limited range of alpha particles in air. Because of the monitoring difficulty, equipment that has been used in a potentially contaminated area is often classified as potentially contaminated and its further use is restricted to other controlled areas. If such equipment could be effectively monitored for contamination, the equipment could be released for use in uncontrolled areas. Previously, contamination inside assemblies has been impossible to detect without dismantling the assembly. The present invention allow contamination detection in any area that air can penetrate.

As used herein, the terms "long range," or "long distance" when referring to the detection capabilities of the present invention, shall mean detection from a range or distance of more than one (1) inch from the source of alpha radiation.

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within an inch of the source of the radiation. Also, these conventional alpha particle detectors can only scan an area approximately equal to the size of the detector.

The primary reason for an alpha particle's short flight path in air is its collision with air molecules. In almost all of these collisions, air ions are created which will have a longer life and area of influence than the alpha particles that created them. These are the ions that are detected by the present invention. The fact that the air ions have a longer range than the alpha particles relieves the necessity for having a detector moved over a person or equipment in order to detect the presence of alpha radiation.

Recently, several patent applications have been filed concerning new apparati for the detection of alpha detection from a long range. These include three applications concerning different embodiments of the long range alpha detector. The first application is Ser. No. 709,566, filed Jun. 3, 1991, for a Long Range Alpha Particle Detector, now issued as U.S. Pat. No. 5,184,019, dated Feb. 2, 1993. The second is Ser. No. 773,002, filed Oct. 8, 1991, for Single and Double Grid Long Range Alpha Detectors, now issued as U.S. Pat. No. 5,194,737, dated Mar. 16, 1993. The third is Ser. No. 799,464, filed Nov. 27, 1991, for Alternating Current Long Range Alpha Particle Detectors, now issued as U.S. Pat. No. 5,187,370, dated Feb. 16, 1993. Two additional applications have been filed concerning applications of the long range alpha detector. One is Ser. No. 864,747, filed Apr. 7, 1992, with the title Alpha Contamination Monitoring of Equipment Interiors now abandoned. The other is Ser. No. 864,746, filed Apr. 7, 1992, with the title of Radon Detector, which has received a Notice of Allowance dated May 11, 1993. The principle underlying each of these co-pending applications is that alpha particles, although themselves of very short range, create air ions which have a longer range and can be detected with the apparatus disclosed. As opposed to the present invention, these applications all involve use of a fan to draw air containing ions created by collision with alpha particles into the detector. The present invention uses no fan, but draws ions to the detector with electric fields. This overcomes the possible problem of stirring up dust and potential contamination and distributing it into the surrounding atmosphere, as with the detectors using fans to draw air into the detector.

The fact that long range alpha detectors, as described in the above-referenced applications, can detect alpha radiation at a considerable distance from its point of emanation allows for monitoring of contamination in several areas which are extremely difficult or even impossible for current detectors. The current invention accomplishes this by the use of electric fields to draw ions from remote and inaccessible locations into the detector.

It is another object of the present invention to provide apparatus for the detection of alpha radiation originating from inaccessible or other difficult to monitor locations.

It is therefore an object of the present invention to provide apparatus for the long range detection of alpha radiation without the need for air moving means to draw air containing ions created by collision with alpha particles into the detector.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a fan-less long range alpha detector for detecting air ions created by collisions with alpha particles originating from the soil, or other solid or liquid surfaces comprising an electrically conductive enclosure having five sides, including a top, but open at its bottom, and in contact with said soil, or other solid, or liquid surfaces. Guard plane means are insulatively mounted to the top side of the electrically conductive enclosure for preventing leakage currents. Signal plane means are insulatively mounted to the guard plane for detecting air ions created by collision with the alpha particles. A voltage source is connected to the indicator means and to the guard plane, and to the electrically conductive enclosure, and indicator means are attached to the signal means for indicating a current produced by collection of the air ions. An electrical field is established between the signal plane means and the soil, or other solid or liquid surfaces, which draws the air ions to the signal plane.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a schematical drawing of one embodiment of the present invention in which the battery and electrometer connections are shown, and in which the facing side is removed to better show the interior arrangement.

FIG. 2 is a chart showing the response of the present invention to three radioactive sources and to normal background.

DETAILED DESCRIPTION

The present invention provides apparatus for the detection of alpha particles originating at a distance from the detector much greater than that normally possible for prior, more conventional alpha detectors. Additionally, the present invention functions without the need for fans to draw air containing ions created by collisions with alpha particles into the detector, as is the case with the above-described co-pending applications. By not moving air through the detector, no dust or potential contamination are spread into the atmosphere.

The invention is best understood by referring to FIG. 1, where a schematical illustration of detector 10 is shown. As seen, detector 10 comprises electrically conductive enclosure 12, which encloses signal plane 14 and guard plane 16. Electrically conductive enclosure 12 is a metallic box which has an open bottom. In one embodiment, it may conveniently be comprised of aluminum. Signal plane 14 and guard plane 16 are mounted to enclosure 12 and to each other using insulative stand-offs 15, which may be made of Teflon ®.

As the present invention does not require the flow of air to detect alpha contamination, there is no requirement for passages through signal plane 14 and guard plane 16, allowing them to be solid plates if desired. As shown, electrically conductive enclosure 12 is grounded to the surface to be monitored. Voltage source 18 has its post 18a connected to the surface to be monitored, and its post 18b connected to guard plane 16, and through electrometer 20 to signal plane 14.

Guard plane 16, while not novel to this invention, is employed because of the deleterious effects of leakage currents to a small signal device such as this. As connected in the present invention, signal plane 14 and guard plane 16 are at the same potential, preventing leakage current between them and through electrometer 20. There is a relatively large leakage current between guard plane 16 and electrically conductive enclosure 12, but this current also does not flow through electrometer 20 because of the connection of guard plane 16 to voltage source 18.

As signal plane 14 and guard plane 16 can be solid, copper sheets may be used in one embodiment. However, other electrically conductive materials can also be employed. It should be understood that planes 14 and 16 could as well be conductive meshes, as in the detectors which require the movement of air.

Voltage source 18 need supply only approximately 300 V for proper operation of detector 10. When detector 10 is used in field operations, it will be most convenient if voltage source 18 is a battery. In many other applications, use of a battery or other direct current source will be preferred. However, an alternating source could also be used. In this event, air ions of both polarities will be detected by signal plane 14.

In operation, detector 10 is placed over the area to be monitored for alpha radiation. Using a direct current voltage source 18. and with its post 18b attached to guard plane 16. and through electrometer 20 to signal plane 14. air ions 24 created by collisions with the short range alpha particles 23 emitted from surface 22 are attracted to signal plane 14 because of the electric field established between signal plane 14 and surface 22.

Electrically conductive enclosure 12 may be constructed of any desired electrically conductive material, such as aluminum. As stated, enclosure 12 is open bottomed, and in contact with surface 22 to be measured. Surface 22 represents, in addition to soil, or other solid or liquid surfaces. All of these may easily be monitored with the present invention, without the deleterious effect of possibly spreading contamination, since a fan is not used to draw air into the detector.

An embodiment of the present invention was constructed in a 20 in. by 20 in. by 6 in. aluminum sample enclosure with 1/32 in. copper plates used for signal plane 14 and guard, plane 16. Insulative stand-offs 15 comprised TEFLON ® insulators establishing a 0.5 in. spacing between signal plane 14 and guard plane 16. A 300 V. battery was used as voltage source 18, and a Keithley 617 electrometer was used as electrometer 20 to measure current. This embodiment of the invention was placed over three $^{239}$Pu alpha sources, as well as over a surface without a radioactive source. The results of this testing is summarized in FIG. 2.

As seen in FIG. 2, the 1100 dpm source produced a 180 fA response, the 680 dpm source produced a 115 fA response, and the 290 dpm source produced a 50 fA response. Background produced a 10 fA response.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fan-less long range alpha particle detector for detecting air ions created by collisions with alpha particles originating from a solid or liquid surface, comprising:
   - an electrically conductive enclosure having five sides, including a top, but open at its bottom, for contacting a solid or liquid surface;
   - guard plane means insulatively mounted to said top side of said electrically conductive enclosure for preventing leakage currents;
   - signal plane means insulatively mounted to said guard plane for detecting air ions created by collision with said alpha particles;
   - indicator means attached to said signal plane means for indicating a current produced by collection of said air ions;
   - a voltage source connected to said indicator means and to said guard plane, and to said electrically conductive enclosure; so as to establish an electric field between said signal plane means and said solid or liquid surface, such that said field draws said air ions to said signal plane to be detected.

2. The fan-less long range alpha detector as described in claim 1, wherein said guard plane means and said signal plane means comprise sheets of copper.

3. The fan-less long range alpha detector as described in claim 1, wherein said guard plane means and said signal plane means comprise planar electrically conductive grids.

4. The fan-less long range alpha detector as described in claim 1, wherein said guard plane means and said signal plane means are insulatively mounted inside said enclosure using TEFLON® (tetraflouroethylene) insulative stand-offs.

5. The fan-less long range alpha detector as described in claim 1, wherein said voltage source comprises a battery having a voltage of approximately 300 V.

6. The fan-less long range alpha detector as described in claim 1, wherein said voltage source comprises a source of approximately 300 VAC.

7. The fan-less long range alpha detector as described in claim 1, wherein said electrically conductive enclosure comprises aluminum.

8. The fan-less long range alpha detector as described in claim 1, wherein said indicator means comprises an electrometer.

* * * * *